United States Patent
Kikuchi et al.

(10) Patent No.: US 8,463,575 B2
(45) Date of Patent: Jun. 11, 2013

(54) GEAR MESHING ANGLE DETECTION METHOD AND DEVICE

(75) Inventors: Toshimasa Kikuchi, Ritto (JP); Ko Ishii, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 573 days.

(21) Appl. No.: 12/445,524

(22) PCT Filed: Oct. 25, 2007

(86) PCT No.: PCT/JP2007/070776
§ 371 (c)(1),
(2), (4) Date: May 29, 2009

(87) PCT Pub. No.: WO2008/053769
PCT Pub. Date: May 8, 2008

(65) Prior Publication Data
US 2010/0023297 A1 Jan. 28, 2010

(30) Foreign Application Priority Data
Oct. 31, 2006 (JP) .................................. 2006-295773

(51) Int. Cl.
*G01C 19/32* (2006.01)
(52) U.S. Cl.
USPC ............................... 702/151; 702/94; 702/150
(58) Field of Classification Search
USPC .................................... 702/94, 150, 151, 163
See application file for complete search history.

(56) References Cited

U.S. PATENT DOCUMENTS

| | | | |
|---|---|---|---|
| 3,924,721 A * | 12/1975 | Reynolds | 400/162.2 |
| 4,372,085 A * | 2/1983 | Wiener et al. | 451/47 |
| 4,920,703 A * | 5/1990 | Hosoya | 451/47 |
| 5,825,730 A * | 10/1998 | Nishida et al. | 369/44.32 |
| 6,530,550 B1 * | 3/2003 | Knighton et al. | 248/349.1 |
| 2002/0124663 A1 * | 9/2002 | Tokumoto et al. | 73/862.333 |
| 2005/0055836 A1 | 3/2005 | Graf et al. | |

FOREIGN PATENT DOCUMENTS

| | | |
|---|---|---|
| JP | 4-336915 A | 11/1992 |
| JP | 7-148617 A | 6/1995 |
| JP | 2000-321173 A | 11/2000 |
| JP | 2000-326141 A | 11/2000 |
| JP | 3132740 B2 | 2/2001 |
| JP | 2004-25333 A | 1/2004 |
| JP | 2005-88191 A | 4/2005 |

* cited by examiner

*Primary Examiner* — Mohamed Charioui
*Assistant Examiner* — Paul D Lee
(74) *Attorney, Agent, or Firm* — Birch, Stewart, Kolasch & Birch, LLP

(57) ABSTRACT

Based on a left tooth surface (28) having a maximum accumulated pitch error ALmax (when clockwise direction is a positive direction) and a right tooth surface (29) having a minimum accumulated pitch error ARmin (when clockwise direction is a positive direction), which are conceived to most likely have insufficiently ground portions, a correction value $\delta\theta$ which cancels these accumulated pitch errors for suppressing the accumulated pitch error after grinding is obtained. A reference tooth groove angle $\theta_0$ is corrected by the correction value $\delta\theta$, thereby obtaining the meshing angle $\theta$ of the work gear. All teeth detection and signal processing in a short period of time is realized by using a displacement sensor and a high-speed meshing-dedicated circuit board.

8 Claims, 13 Drawing Sheets

LEFT TOOTH SURFACE    ※R=REFERENCE

RIGHT TOOTH SURFACE    ※R=REFERENCE

※R=REFERENCE

※R=REFERENCE

GEAR MESHING ANGLE DETECTION METHOD AND DEVICE

TECHNICAL FIELD

The present invention relates to a gear meshing angle detection method and device.

BACKGROUND ART

A gear which has undergone gear cutting processing by a gear cutting machine such as a hobbing machine is further subjected to finishing processing by a gear finishing machine such as a gear grinding machine.

In the finishing processing of the gear, before actually starting finishing processing (grinding), a process of "meshing" for achieving rotation phase relation wherein teeth (mountains and valleys) of a grinding tool such as a screw-like grindstone can be meshed with teeth (mountains and valleys) of a work gear (for example, a gear which has undergone hob cutting and quenching) is required.

In the meshing process, the meshing angle of the work gear attached to a table shaft is required to be obtained. As a method for obtaining the meshing angle, conventionally, a method in which the positions of the teeth (mountains and valleys) of the work gear are detected by a touch probe, which is a contact type sensor, or a nearby sensor, which is a non-contact type sensor, and the meshing angle is obtained by an NC device based on detected signals thereof has been used.

For example, when the nearby sensor is used, as shown in FIG. 15, after a nearby sensor head 4, which is a detection unit of the nearby sensor, is disposed in the vicinity of teeth 3 of a work gear 2 attached to a table shaft 1, both left and right tooth surfaces 6 and 7 of the work gear 2 are detected by the nearby sensor head 4 while the work gear 2 is rotated together with the table shaft 1 as shown by an arrow A by an unshown motor, and the detection signals thereof are output to an NC device via a nearby sensor amplifier 5, which is a signal processing unit of the nearby sensor.

Note that prior art documents describing meshing of gears include the followings.
Patent Document 1: Japanese Patent Application Laid-Open (kokai) No. 2004-25333
Patent Document 2: Japanese Patent No. 3132740
Patent Document 3: Japanese Patent Application Laid-Open (kokai) No. 2000-326141

DISCLOSURE OF THE INVENTION

Problems to be Solved by the Invention

Recently, for example for reducing noise/reducing vibrations such as, for example, transmission gears for automobiles, demands for processing accuracy of gears are increasing more and more, and highly accurate finishing processing of gears has to be performed for satisfying the demands. In order to perform such highly accurate finishing processing, a method in which an optimal meshing angle is detected in a meshing process, that is, the optimal meshing angle capable of cancelling accumulated pitch errors of both left and right tooth surfaces, preventing generation of insufficiently ground portions on both the left and right tooth surfaces, and reducing grinding allowance of both the left and right tooth surfaces as much as possible is detected, is desired.

Thermal distortion is generated in a quenched gear, the thermal distortion appears in the numerical values of accumulated pitch errors or fluctuation in tooth grooves in gear accuracy, and problems such as gear noise are readily generated when the values are large. Therefore, the gear after quenching is desired to be subjected to finishing processing so that the thermal distortion can be removed for further improving accuracy. In this case, in order to reduce the accumulated pitch errors, not only the limited number of teeth of the work gear, but the positions (angles) of both left and right tooth surfaces of all the teeth (entire circumference) have to be detected, and optimal meshing angles like that described above have to be obtained based on the detected values. Moreover, in order to improve productivity, the "meshing" time not directly related to actual processing is required to be shortened as much as possible.

On the other hand, since the contact type sensor such as a touch probe takes time in detection, it is difficult to satisfy the demand for highly accurately obtaining the meshing angle by performing all-teeth detection in a short period of time. Also in the case in which the nearby sensor is used, it is also difficult to satisfy the above described demand since obtaining the meshing angle takes time for the below described reasons.

(1) Since the response speed of the nearby sensor is slow, the work gear 2 cannot be rotated at a high speed. Therefore, detection of both left and right tooth surfaces 6 and 7 takes time.

(2) In the nearby sensor, due to influence of hysteresis, merely approaching side signals are utilized. Therefore, the both left and right tooth surfaces 6 and 7 of the work gear 2 cannot be detected merely by rotation in one direction, and, after the work gear 2 is rotated forward like an arrow A1 as shown in FIG. 16 (a) to detect the left tooth surface 6, the right tooth surface 7 has to be detected by reversely rotating the work gear 2 like an arrow A2 as shown in FIG. 16 (b). Therefore, detection of the both left and right tooth surfaces 6 and 7 takes time.

(4) When external signals, for example, from a sensor are to be processed by an NC device, high-speed processing cannot be performed since signal intervals (input time) is restricted in the NC device.

Therefore, in view of the above described circumstances, it is an object of the present invention to provide a gear meshing angle detection method and device which can detect an optimal meshing angle capable of cancelling accumulated pitch errors of both left and right tooth surfaces, preventing generation of insufficiently ground portions in both left and right tooth surfaces, and reducing grinding allowance of the both left and right tooth surfaces as much as possible and can obtain the meshing angle by detecting all teeth in a short period of time.

Means for Solving the Problems

The gear meshing angle detection method of first invention which solve the above described problems is a gear meshing angle detection method which detects a meshing angle of a work gear attached to a work rotation shaft, characterized by including a first process of obtaining a left tooth surface angle and a right tooth surface angle from a starting point of the work rotation shaft for all teeth of the work gear;

a second process of obtaining a left tooth surface accumulated pitch error and a right tooth surface accumulated pitch error for all the teeth based on the left tooth surface angle and the right tooth surface angle;

a third process of obtaining a left tooth surface maximum accumulated pitch error and a right tooth surface minimum accumulated pitch error from the left tooth surface accumulated pitch error and the right tooth surface accumulated pitch error wherein the clockwise direction of the work gear is as a positive direction;

a fourth process of obtaining an angle of a reference tooth groove based on the left tooth surface angle and the right tooth surface angle;

a fifth process of averaging the left tooth surface maximum accumulated pitch error and the right tooth surface minimum accumulated pitch error so as to obtain a correction value of an angle of the reference tooth groove; and a sixth process of correcting the reference tooth groove angle by the correction value so as to obtain the meshing angle.

The gear meshing angle detection method of second invention is the gear meshing angle detection method of the first invention, characterized in that an incremental-type rotary encoder which rotates in one direction together with the work rotation shaft and outputs a Z-phase pulse, an A-phase pulse, and a B-phase pulse and a displacement sensor which detects the positions of the left tooth surface and right tooth surface of all the teeth of the work gear and outputs a left tooth surface position detection signal and a right tooth surface position detection signal when the work gear is rotated in one direction together with the work rotation shaft are used; and, in the first process, the Z phase of the rotary encoder is used as the starting point of the work rotation shaft, the number of pulses of the A-phase pulse and the B-phase pulse which are output from the rotary encoder after the Z-phase pulse is output from the rotary encoder is counted, and the counted values are latched by the left tooth surface position detection signal and the right tooth surface position detection signal of the displacement sensor so as to obtain the left tooth surface angle and the right tooth surface angle from the starting point of the work rotation shaft.

The gear meshing angle detection method of third invention is the gear meshing angle detection method of the first invention, characterized in that a starting point detection means which detects the starting point of the work rotation shaft and outputs a starting point detection signal when the work rotation shaft is rotated in one direction, a clock which outputs a clock pulse, and a displacement sensor which detects the positions of the left tooth surface and the right tooth surface of all the teeth of the work gear and outputs a left tooth surface position detection signal and a right tooth surface position detection signal when the work gear is rotated in one direction together with the work rotation shaft are used; and, in the first process, the number of pulses of the clock pulse output from the clock is counted after the starting point detection signal is output from the starting point detection means, and the counted value is latched by the left tooth surface position detection signal and the right tooth surface position detection signal of the displacement sensor so as to obtain the left tooth surface angle and the right tooth surface angle from the starting point of the work rotation shaft.

A gear meshing angle detection device of fourth invention is a gear meshing angle detection device which detects a meshing angle of a work gear attached to a work rotation shaft, characterized by having a first means of obtaining a left tooth surface angle and a right tooth surface angle from a starting point of the work rotation shaft for all teeth of the work gear;

a second means of obtaining a left tooth surface accumulated pitch error and a right tooth surface accumulated pitch error for all the teeth based on the left tooth surface angle and the right tooth surface angle;

a third means of obtaining a left tooth surface maximum accumulated pitch error and a right tooth surface minimum accumulated pitch error from the left tooth surface accumulated pitch error and the right tooth surface accumulated pitch error wherein the clockwise direction of the work gear is as a positive direction;

a fourth means of obtaining an angle of a reference tooth groove based on the left tooth surface angle and the right tooth surface angle;

a fifth means of averaging the left tooth surface maximum accumulated pitch error and the right tooth surface minimum accumulated pitch error so as to obtain a correction value of an angle of the reference tooth groove; and a sixth means of correcting the reference tooth groove angle by the correction value so as to obtain the meshing angle.

The gear meshing angle detection device of fifth invention is the gear meshing angle detection device of the fourth invention, characterized in that an incremental-type rotary encoder which rotates in one direction together with the work rotation shaft and outputs a Z-phase pulse, an A-phase pulse, and a B-phase pulse and a displacement sensor which detects the positions of the left tooth surface and right tooth surface of all the teeth of the work gear and outputs a left tooth surface position detection signal and a right tooth surface position detection signal when the work gear is rotated in one direction together with the work rotation shaft are provided; and, in the first means, the Z phase of the rotary encoder as the starting point of the work rotation shaft is used, the number of pulses of the A-phase pulse and the B-phase pulse which are output from the rotary encoder after the Z-phase pulse is output from the rotary encoder is counted, and the counted values are latched by the left tooth surface position detection signal and the right tooth surface position detection signal of the displacement sensor so as to obtain the left tooth surface angle and the right tooth surface angle from the starting point of the work rotation shaft.

The gear meshing angle detection device of sixth invention is the gear meshing angle detection device of the fourth invention, characterized in that a starting point detection means which detects the starting point of the work rotation shaft and outputs a starting point detection signal when the work rotation shaft is rotated in one direction, a clock which outputs a clock pulse, and a displacement sensor which detects the positions of the left tooth surface and the right tooth surface of all the teeth of the work gear and outputs a left tooth surface position detection signal and a right tooth surface position detection signal when the work gear is rotated in one direction together with the work rotation shaft are provided; and, in the first means, the number of pulses of the clock pulse output from the clock after the starting point detection signal is output from the starting point detection means is counted, and the counted value is latched by the left tooth surface position detection signal and the right tooth surface position detection signal of the displacement sensor so as to obtain the left tooth surface angle and the right tooth surface angle from the starting point of the work rotation shaft.

The gear meshing angle detection device of seventh invention is the gear meshing angle detection device of the fifth or sixth invention, characterized in that a meshing-dedicated circuit board is provided; and the first means, the second means, the third means, the fourth means, the fifth means, and the sixth means are calculation processing programs executed by a processor mounted in the meshing-dedicated circuit board, and a clock of a clock frequency which can handle a response speed of the displacement sensor is mounted on the meshing-dedicated circuit board.

Effects of the Invention

The gear meshing angle detection method of the first invention or the gear meshing angle detection device of the fourth invention is characterized by having a first process (means) of obtaining a left tooth surface angle and a right tooth surface angle from a starting point of the work rotation shaft for all teeth of the work gear; a second process (means) of obtaining a left tooth surface accumulated pitch error and a right tooth surface accumulated pitch error for all the teeth based on the left tooth surface angle and the right tooth surface angle; a third process (means) of obtaining a left tooth surface maximum accumulated pitch error and a right tooth surface minimum accumulated pitch error from the left tooth surface accumulated pitch error and the right tooth surface accumulated pitch error wherein the clockwise direction of the work gear is as a positive direction; a fourth process (means) of obtaining an angle of a reference tooth groove based on the left tooth surface angle and the right tooth surface angle; a fifth process (means) of averaging the left tooth surface maximum accumulated pitch error and the right tooth surface minimum accumulated pitch error so as to obtain a correction value of an angle of the reference tooth groove; and a sixth process (means) of correcting the reference tooth groove angle by the correction value so as to obtain the meshing angle. Therefore, in other words, the correction value is obtained based on the left tooth surface having the maximum accumulated pitch error (when the clockwise direction is a positive direction) and the right tooth surface having the minimum accumulated pitch error (when the clockwise direction is the positive direction), which are conceived to most likely generate insufficiently ground portions; and the meshing angle of the work gear is obtained by correcting the reference tooth groove angle by the correction value. Therefore, the optimal meshing angle capable of cancelling the accumulated pitch errors of both the left and right tooth surfaces, preventing generation of insufficiently ground portions on the both left and right tooth surfaces, and reducing the grinding allowance of both the left and right tooth surfaces as much as possible can be obtained.

Moreover, the gear meshing angle detection method of the second invention or the gear meshing angle detection device of the fifth invention is characterized in that, in the first process (means), the Z phase of the rotary encoder is used as the starting point of the work rotation shaft, the number of pulses of the A-phase pulse and the B-phase pulse which are output from the rotary encoder after the Z-phase pulse is output from the rotary encoder is counted, and the counted values are latched by the left tooth surface position detection signal and the right tooth surface position detection signal of the displacement sensor so as to obtain the left tooth surface angle and the right tooth surface angle from the starting point of the work rotation shaft. Therefore, the left tooth surface angles and the right tooth surface angles of all the teeth can be detected at high accuracy and at a high speed.

The gear meshing angle detection method of the third invention or the gear meshing angle detection device of the sixth invention is characterized in that, in the first process (means), the number of pulses of the clock pulse output from the clock is counted after the starting point detection signal is output from the starting point detection means, and the counted value is latched by the left tooth surface position detection signal and the right tooth surface position detection signal of the displacement sensor so as to obtain the left tooth surface angle and the right tooth surface angle from the starting point of the work rotation shaft. Therefore, the left tooth surface angles and the right tooth surface angles of all the teeth can be detected at high accuracy at a high speed.

The gear meshing angle detection device of the seventh invention is characterized in that the first means, the second means, the third means, the fourth means, the fifth means, and the sixth means are calculation processing programs executed by a processor mounted in the meshing-dedicated circuit board, and a clock of a clock frequency which can handle a response speed of the displacement sensor is mounted on the meshing-dedicated circuit board. Therefore, the left tooth surface angles and the right tooth surface angles of all the teeth can be detected at a significantly high speed by fully utilizing the excellent response speed (sampling speed) of the displacement sensor.

BRIEF DESCRIPTION OF THE DRAWINGS

FIG. 3 (b) is an explanatory diagram of the response speed (sampling speed) of a displacement sensor amplifier.

FIG. 12 (b) is an explanatory diagram exemplary showing the relation among a starting point detection signal of a starting point detection sensor, the clock pulses, and an ON-OFF signal of a displacement sensor.

DESCRIPTION OF SYMBOLS

11: MAIN SHAFT; 12: TABLE SHAFT; 13: GRINDING TOOL; 14: WORK GEAR; 15: MAIN SHAFT MOTOR; 16: TABLE SHAFT MOTOR; 17, 18: TEETH; 21: DISPLACEMENT SENSOR HEAD; 22: DISPLACEMENT SENSOR AMPLIFIER; 23: ROTARY ENCODER; 24: HIGH-SPEED MESHING-DEDICATED CIRCUIT BOARD; 25: ROTATION SHAFT; 26: NC DEVICE; 27: TOOTH GROOVE; 28: LEFT TOOTH SURFACE; 29: RIGHT TOOTH SURFACE; 31: STARTING POINT PROJECTION; 32: STARTING POINT DETECTION SENSOR; 41, 42, 43, 44: INPUT CONNECTOR UNITS; 45: ENCODER SIGNAL INPUT IF CIRCUIT UNIT; 46: NC/STARTING POINT DETECTION SIGNAL INPUT IF CIRCUIT UNIT; 47: DISPLACEMENT SENSOR INPUT IF CIRCUIT UNIT; 48: ROM UNIT; 49: PROCESSOR UNIT; 50: DCDC CONVERSION UNIT; 51: 24 V POWER SOURCE UNIT; 52: POWER SOURCE INPUT TERMINAL BASE UNIT; 53: RESET SWITCH UNIT; 54: DIPSW UNIT; 55: LED DISPLAY UNIT; 56: LED DRIVE UNIT; 57: CLOCK UNIT; 58: SRAM UNIT; 59: OUTPUT IF UNIT; 60: OUTPUT CONNECTOR UNIT

BEST MODES FOR CARRYING OUT THE INVENTION

Hereinafter, embodiments of the present invention will be described in detail based on drawings.

<Configuration>

Figure 1:
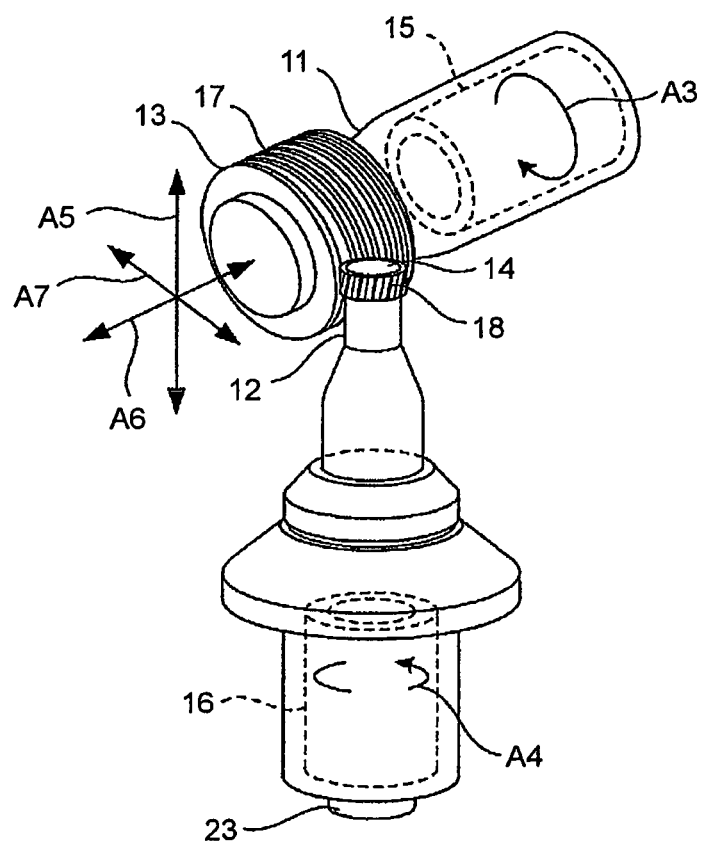
FIG. 1 is a perspective view showing a configuration of a main part of a gear finishing machine such as a gear grinding machine in which a gear meshing angle detection device according to an embodiment of the present invention is mounted.
Figure 2:
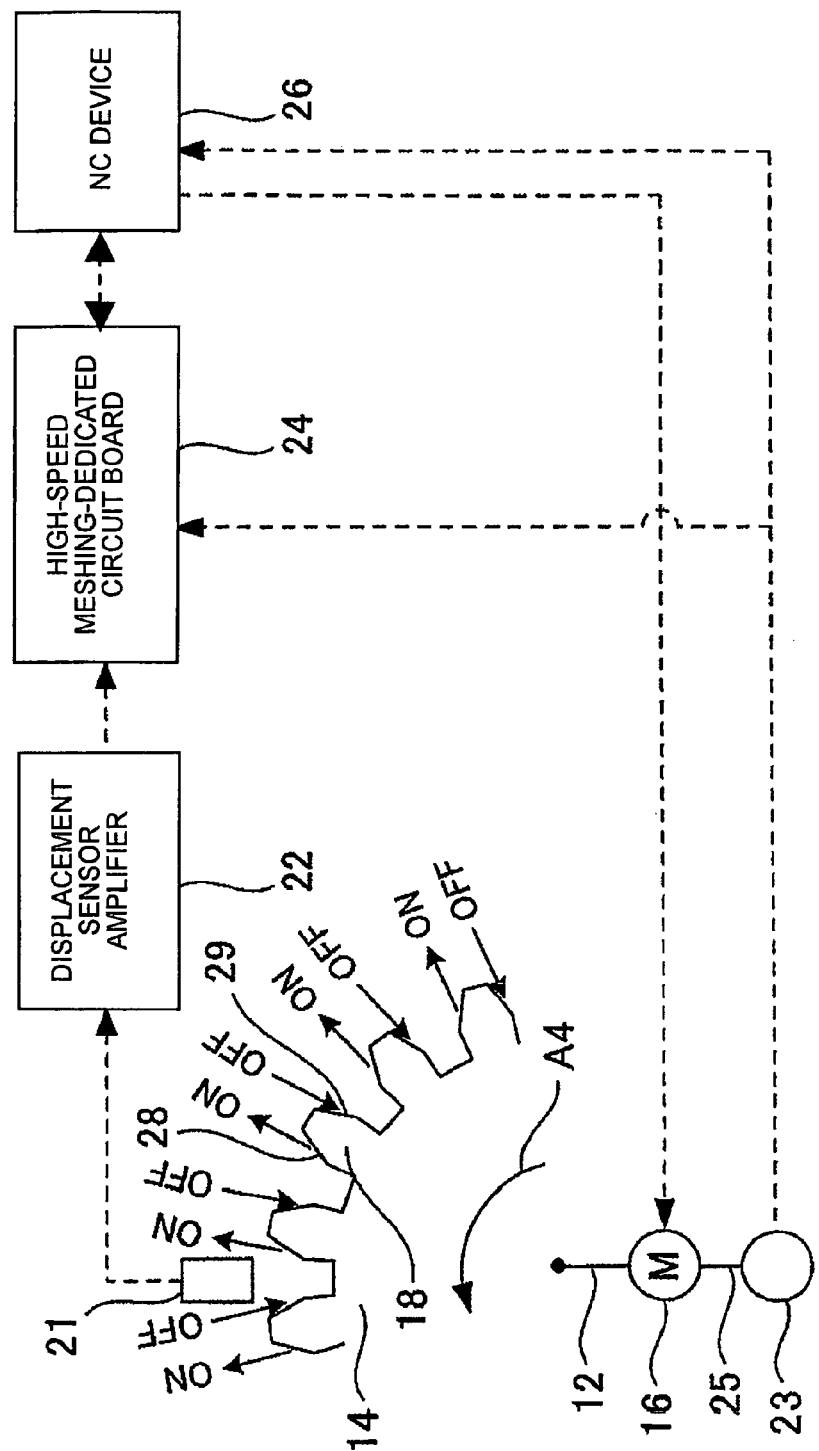
FIG. 2 is a block diagram showing a configuration of the meshing angle detection device.
Figure 3:
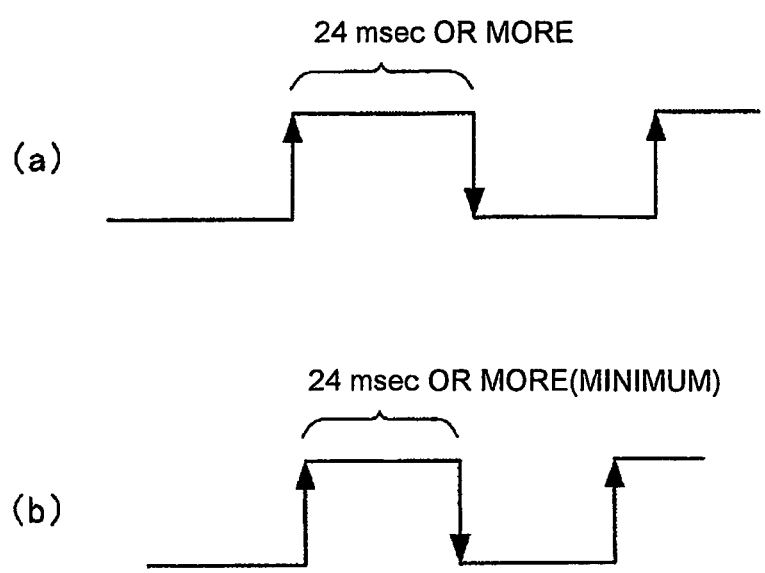
FIG. 3 (a) is an explanatory diagram of signal intervals (input time) which can be processed by an NC device.
Figure 4:
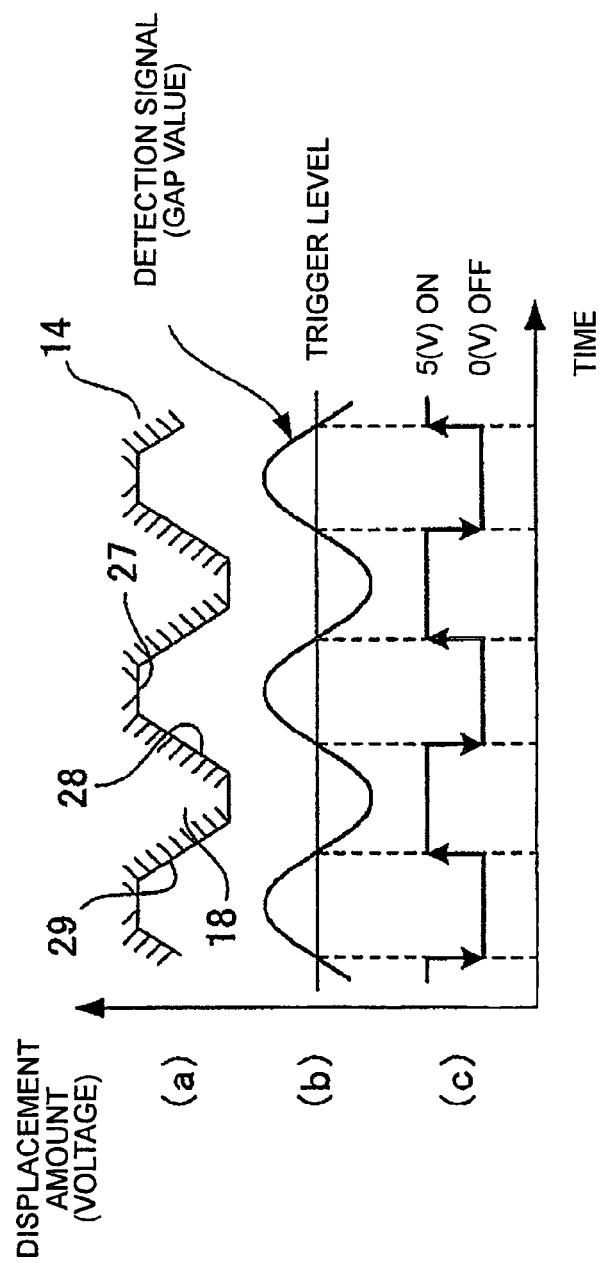
FIG. 4 is an explanatory diagram showing an outline of a detection signal of a displacement sensor head and signal processing of the displacement sensor amplifier.
Figure 5:
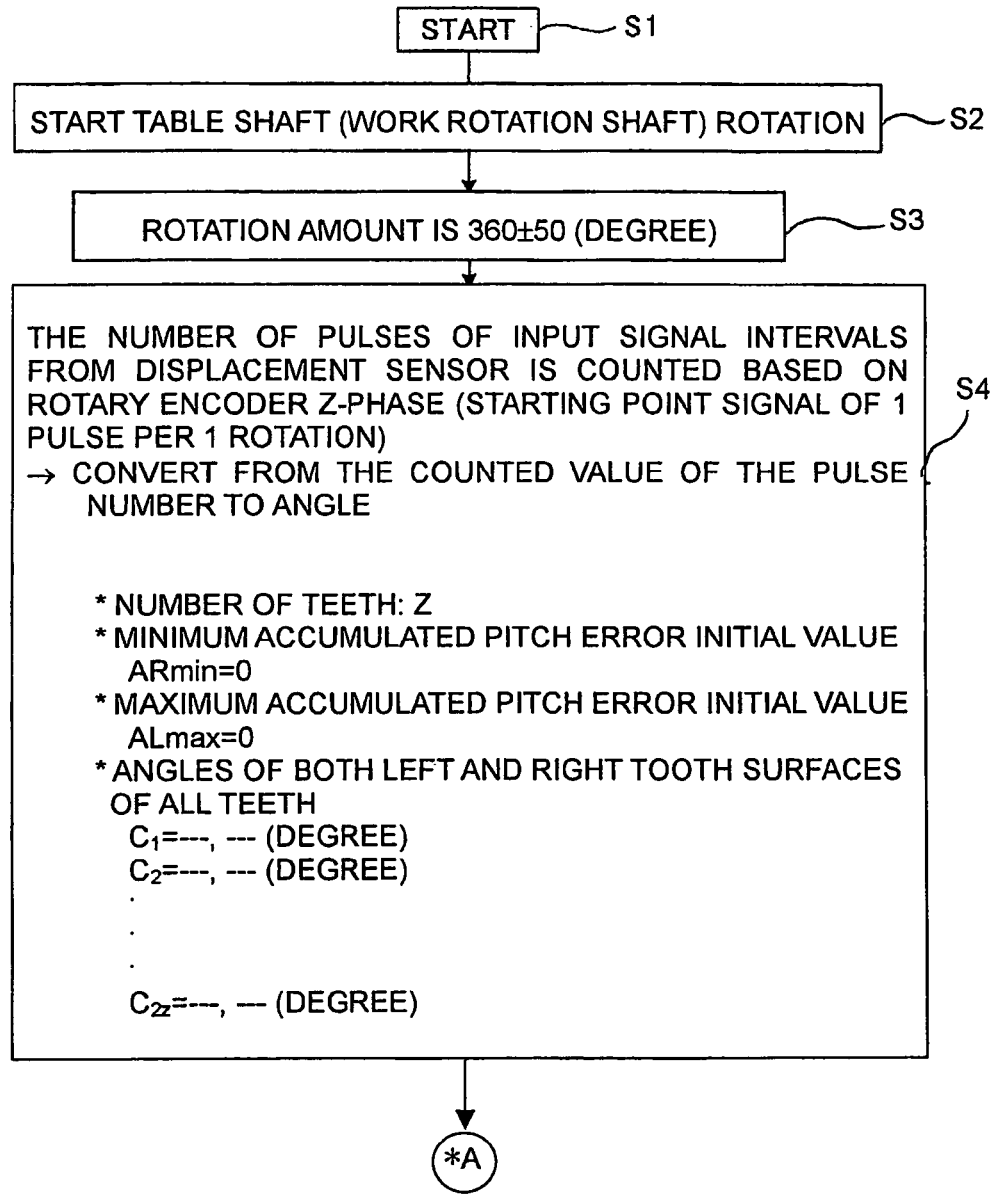
FIG. 5 is a flow chart showing the flow of a meshing angle detection process.
Figure 6:
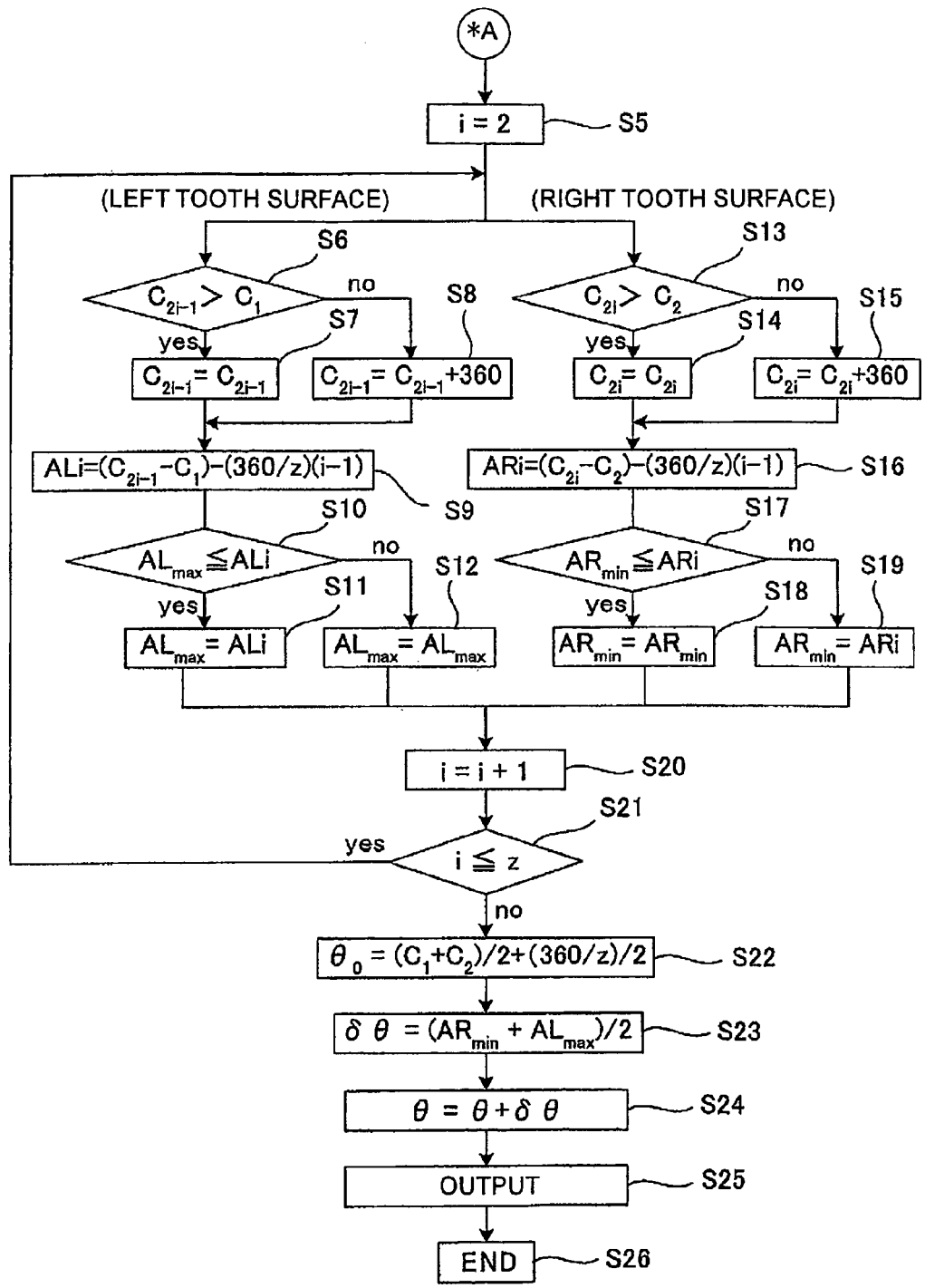
FIG. 6 is a flow chart showing the flow of a meshing angle detection process.
Figure 7:
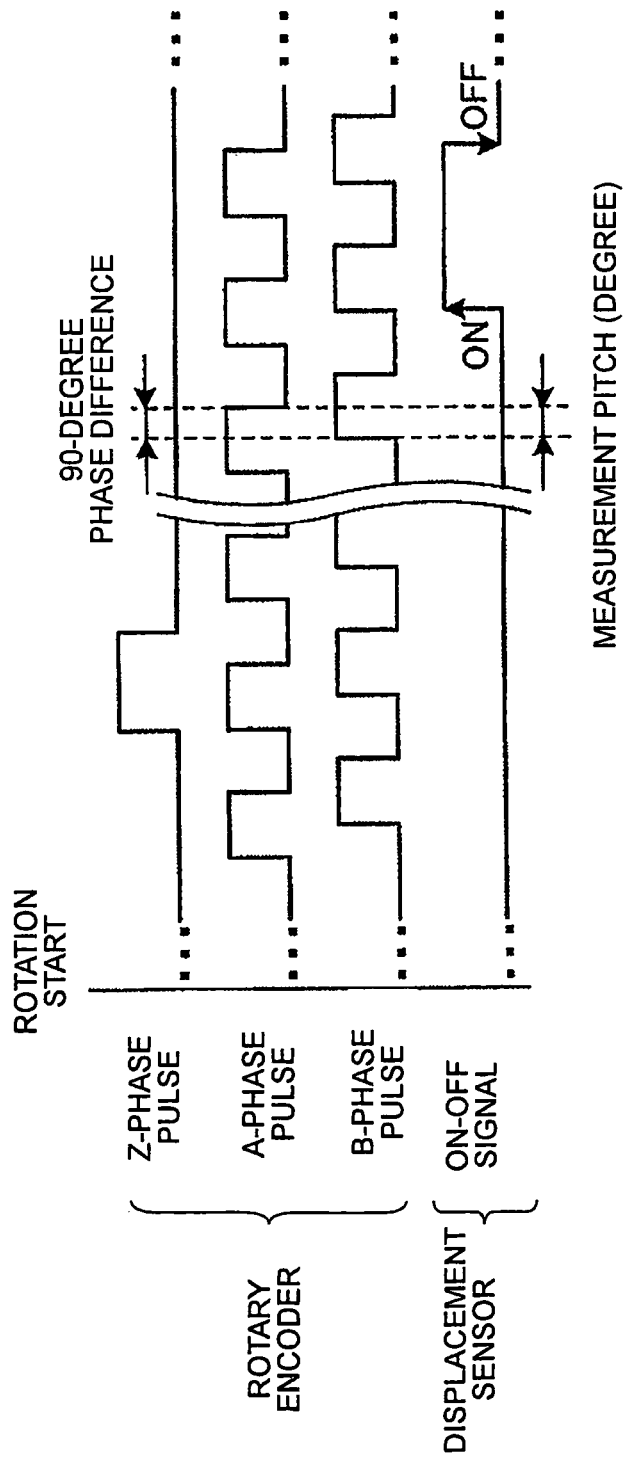
FIG. 7 is an explanatory diagram exemplary showing the relation between pulse signals of a rotary encoder and an ON-OFF signal of a displacement sensor.
Figure 8:
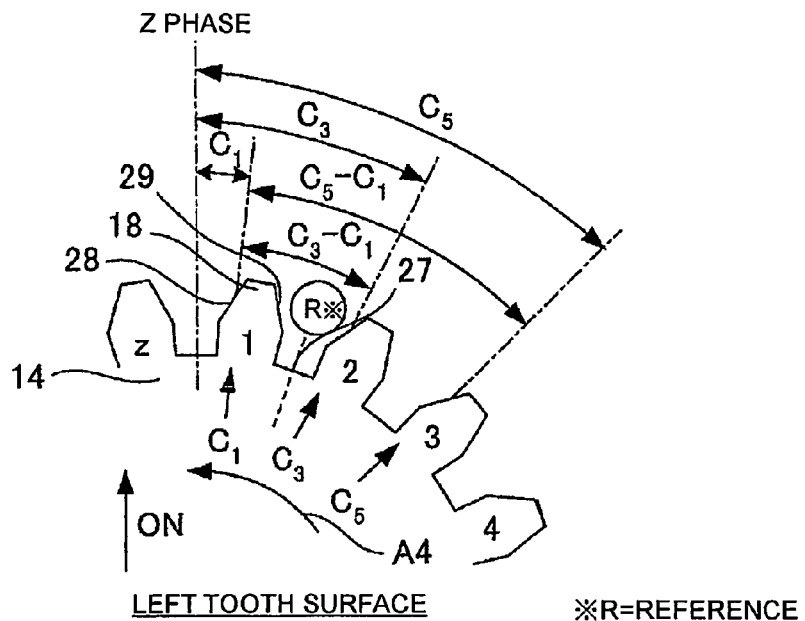
FIG. 8 is an explanatory diagram about a way of obtaining the angle of a left tooth surface.
Figure 9:
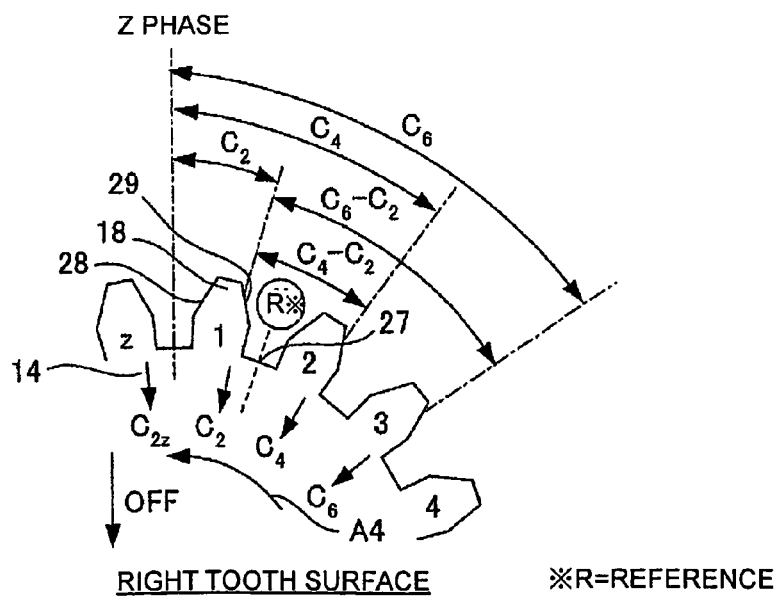
FIG. 9 is an explanatory diagram about a way of obtaining the angle of a right tooth surface.
Figure 10:
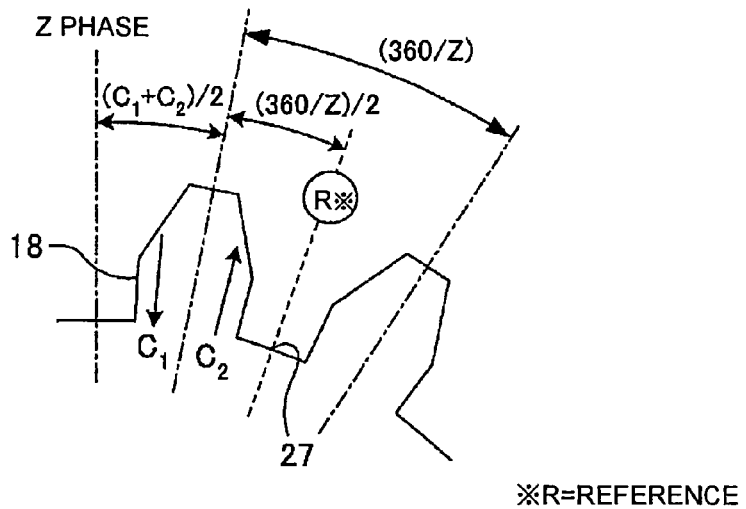
FIG. 10 is an explanatory diagram about a way of obtaining the angle of a reference tooth groove.
Figure 11:
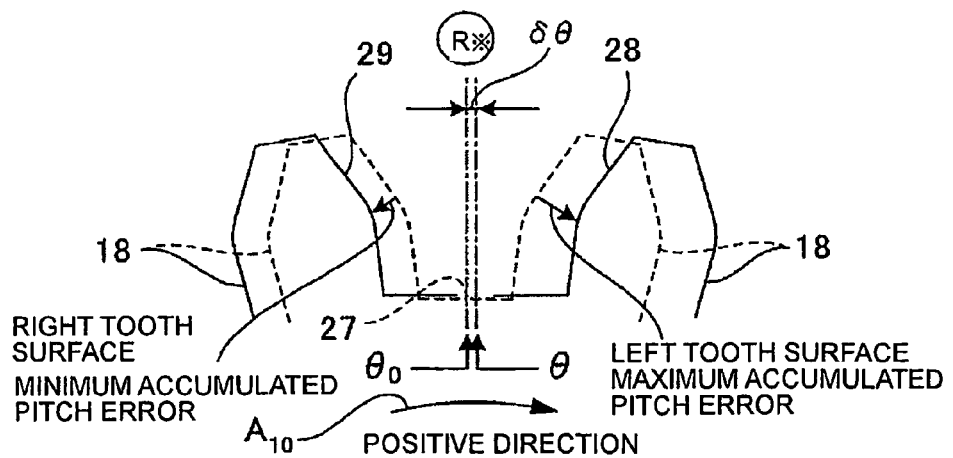
FIG. 11 is an explanatory diagram about a correction method of the reference tooth groove angle.

FIG. 1 is a perspective view showing a configuration of a main part of a gear finishing machine such as a gear grinding machine in which a gear meshing angle detection device according to an embodiment of the present invention is mounted, and FIG. 2 is a block diagram showing a configuration of the meshing angle detection device. FIG. 3 (a) is an explanatory diagram of signal intervals (input time) which can be processed by an NC device, FIG. 3 (b) is an explanatory diagram of the response speed (sampling speed) of a displacement sensor amplifier, and FIG. 4 is an explanatory diagram showing an outline of a detection signal of a displacement sensor head and signal processing of the displacement sensor amplifier. FIG. 5 and FIG. 6 are flow charts showing the flow of a meshing angle detection process, and FIG. 7 is an explanatory diagram exemplary showing the relation between pulse signals of a rotary encoder and an ON-OFF signal of a displacement sensor, FIG. 8 is an explanatory diagram about a way of obtaining the angle of a left tooth surface, FIG. 9 is an explanatory diagram about a way of obtaining the angle of a right tooth surface, FIG. 10 is an explanatory diagram about a way of obtaining the angle of a reference tooth groove, and FIG. 11 is an explanatory diagram about a correction method of the reference tooth groove angle.

Figure 12:
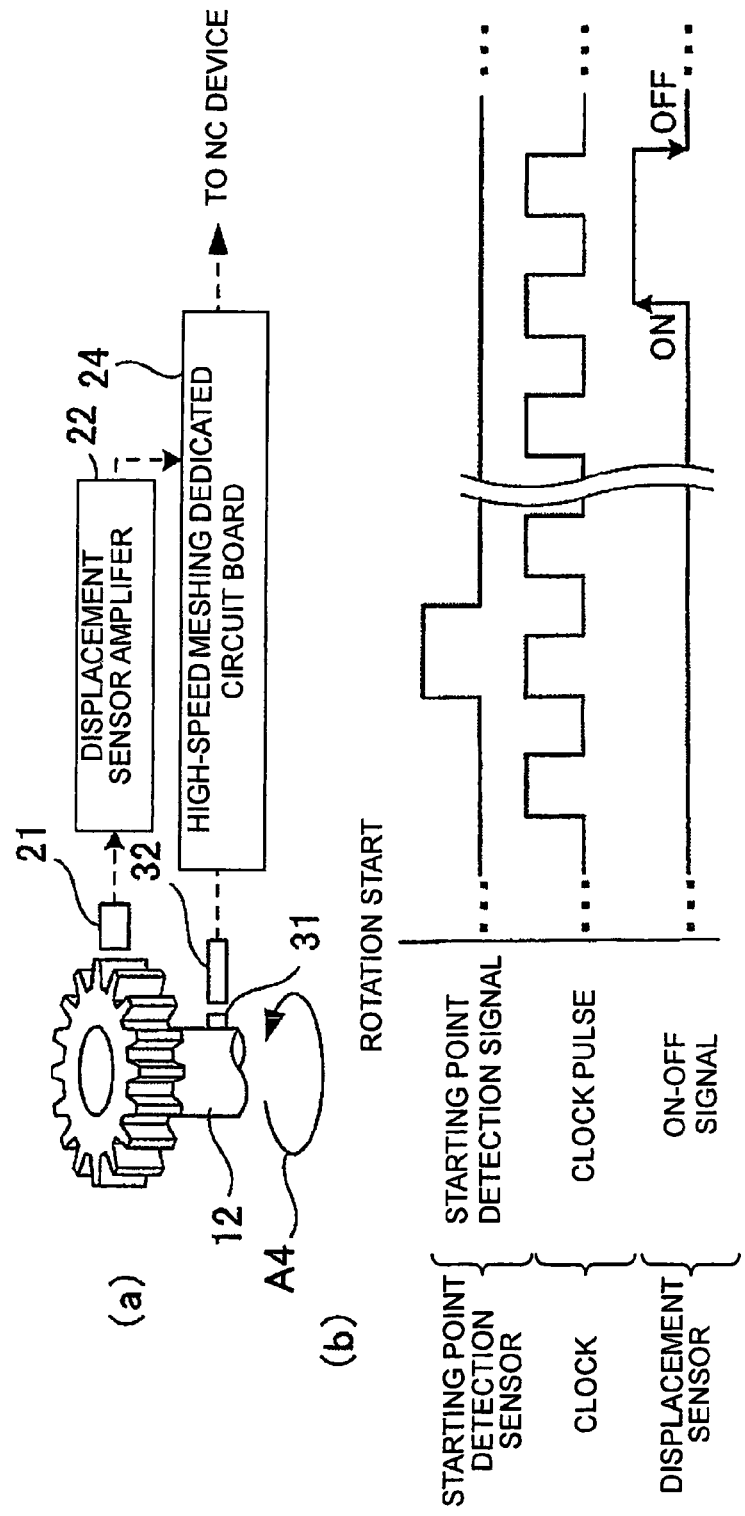
FIG. 12 (a) is a block diagram showing a configuration of a gear meshing angle detection device of a case in which angles of both left and right tooth surfaces are obtained by using clock pulses.
Figure 13:
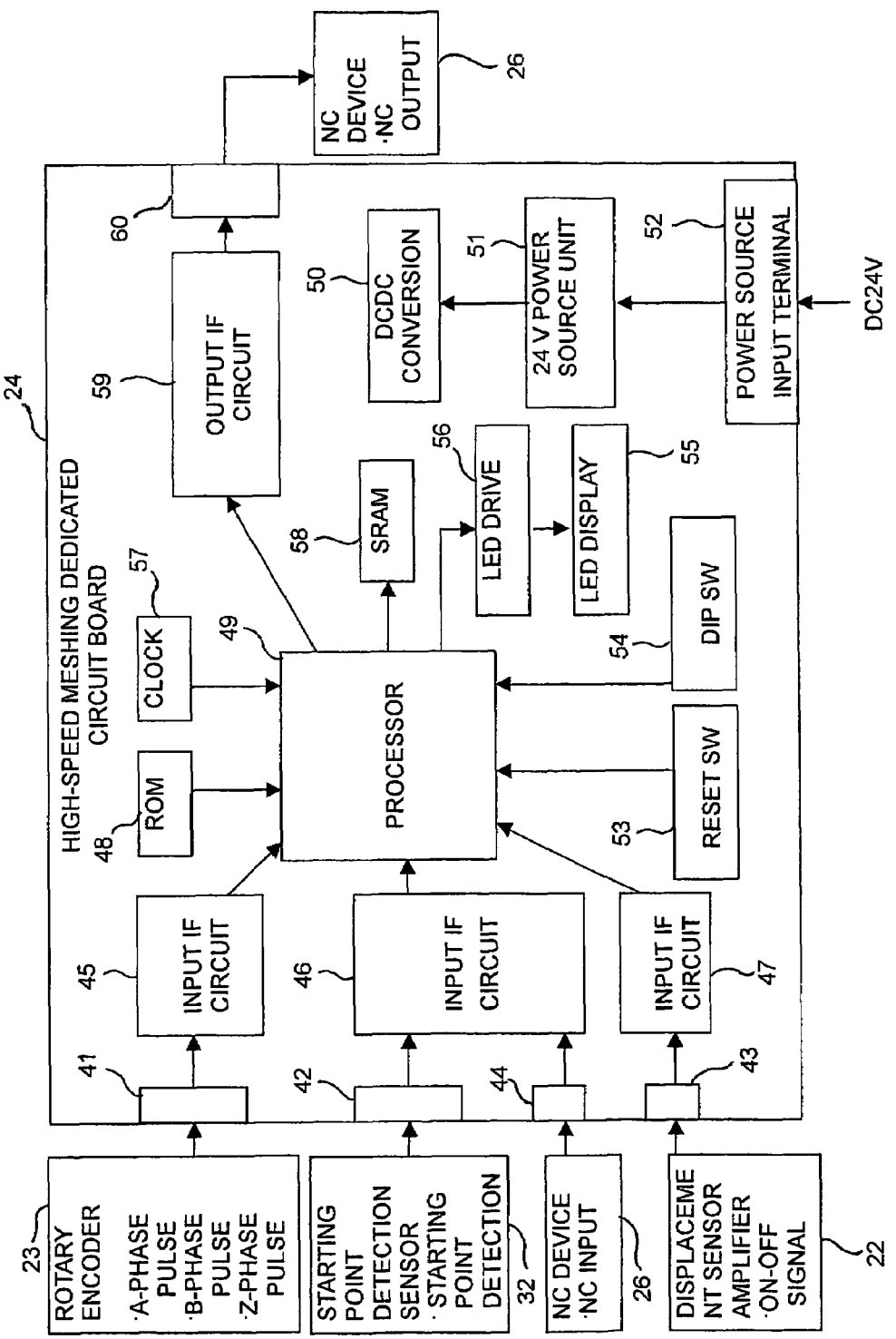
FIG. 13 is a block diagram showing an outline of a circuit configuration of a high-speed meshing-dedicated circuit board.
Figure 14:
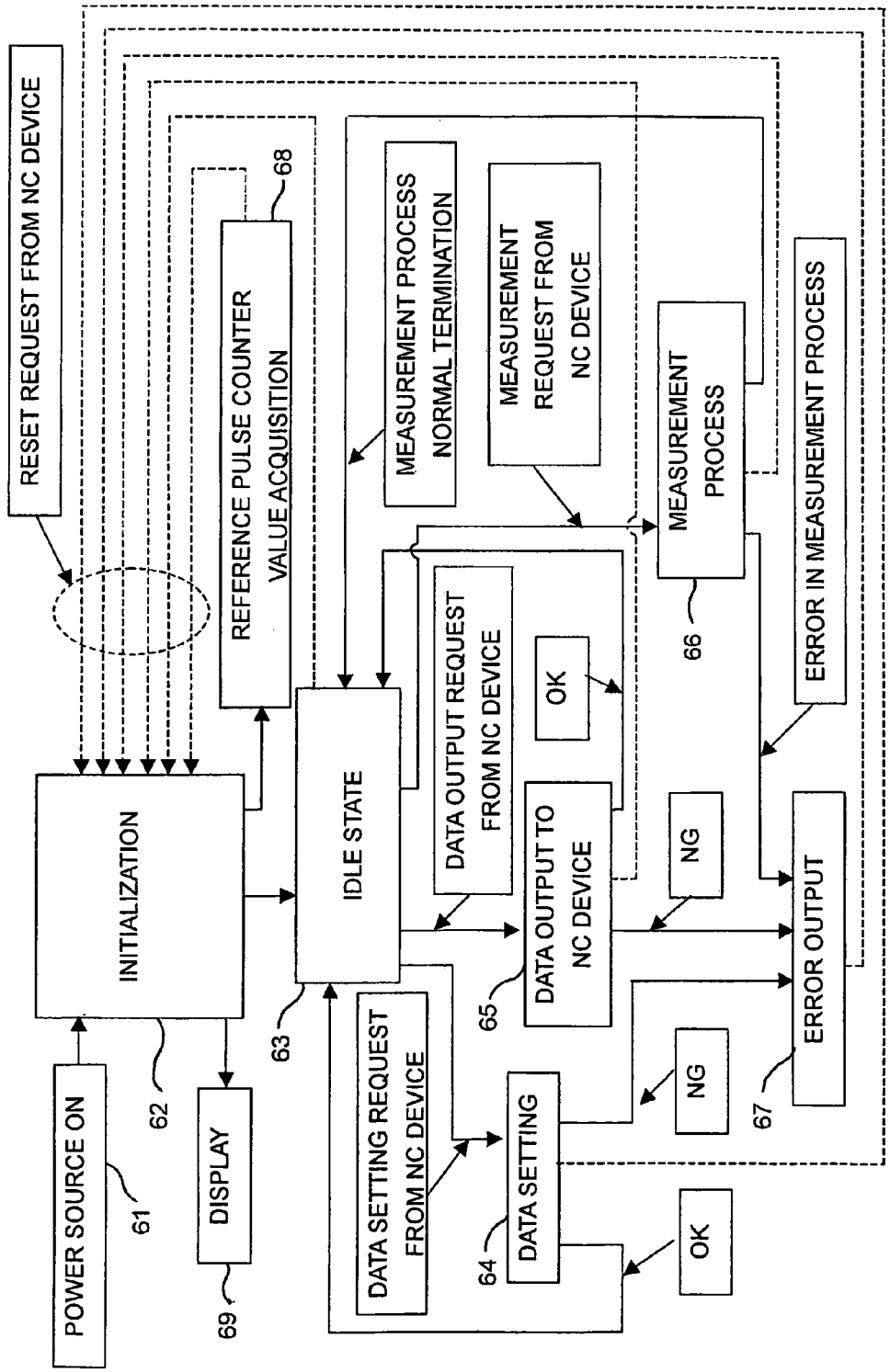
FIG. 14 is a diagram showing an outline of state transition of the high-speed meshing-dedicated circuit board.
Figure 15:
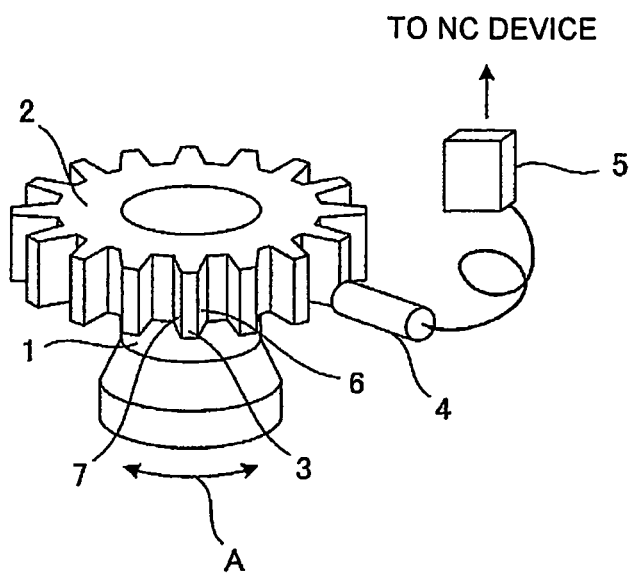
FIG. 15 is a diagram showing a conventional example of a case in which a nearby sensor is used.
Figure 16:
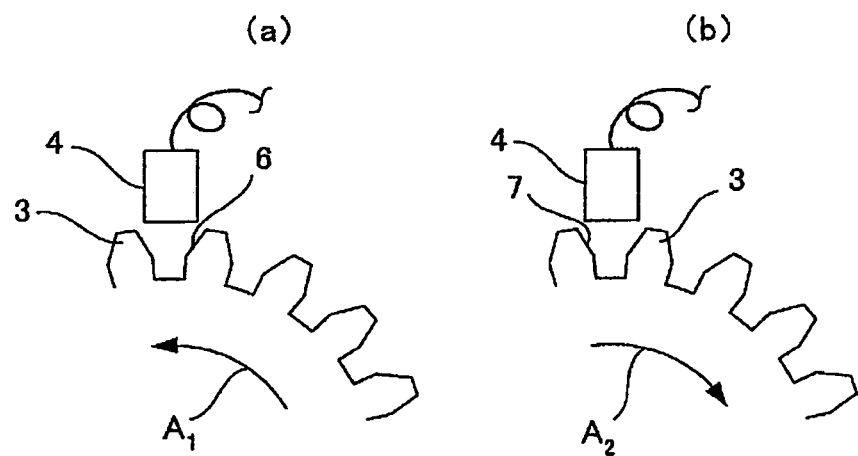
FIGS. 16 (a) and (b) are Diagrams showing the conventional example in which the nearby sensor is used.

FIG. 12 (a) is a block diagram showing a configuration of a gear meshing angle detection device of a case in which angles of both left and right tooth surfaces are obtained by using clock pulses, and FIG. 12 (b) is an explanatory diagram exemplary showing the relation among a starting point detection signal of a starting point detection sensor, the clock pulses, and an ON-OFF signal of a displacement sensor. FIG. 13 is a block diagram showing an outline of a circuit configuration of a high-speed meshing-dedicated circuit board, and FIG. 14 is a diagram showing an outline of state transition of the high-speed meshing-dedicated circuit board.

As shown in FIG. 1, a gear finishing machine such as a gear grinding machine has a main shaft 11 and a table shaft 12 (referred to as a C shaft) serving as a work rotating shaft. A grinding tool (a screw-like grindstone in the example shown in the drawing) 13 is attached to the main shaft 11, and a gear 14 which has undergone gear cutting by a gear cutting machine such as a hobbing machine and quenching is attached to the table shaft 12 as a work. The grinding tool 13 is driven by a main shaft motor 15 so as to rotate together with the main shaft 11 as by an arrow A3, and the work gear 14 is driven by a table shaft motor 16 so as to rotate together with the table shaft as shown by an arrow A4.

Moreover, although illustration is omitted, for example, a Z-shaft drive unit for axially moving the grinding tool 13 as shown by an arrow A5, a Y-shaft driving unit for shifting the grinding tool 13 as shown by an arrow A6, and an X-shaft drive unit for causing the grinding tool 13 to approach/get away from the work gear 14 as shown by an arrow A7 are also provided in the gear finishing machine. When the drive units of each shaft are actuated, finishing processing (grinding) of the work gear 14 can be performed by rotating the grinding tool 13 and the work gear 14 in the state in which teeth 17 (mountains and valleys) of the grinding tool 13 and teeth 18 (mountains and valleys) of the work gear 14 are meshed with each other.

Before starting such actual finishing processing, there is a process of "meshing" for achieving a rotation phase relation wherein the teeth 17 (mountains and valleys) of the grinding tool 13 and the teeth 18 (mountains and valleys) of the work gear 14 can be meshed with each other; and, in the meshing process, a meshing angle of the work gear 14 attached to the table shaft 12 has to be detected. The configuration of a meshing angle detection device thereof will be described based on FIG. 2.

As shown in FIG. 2, the meshing angle detection device of the present embodiment has a configuration having a displacement sensor (displacement sensor head 21 and displacement sensor amplifier 22) of an eddy current type, a rotary encoder 23 of an incremental type, and a high-speed meshing-dedicated circuit board 24.

As shown in FIG. 1 and FIG. 2, the rotary encoder 23 is coupled to the table shaft 12 via a rotating shaft 25 of the table shaft motor 16 and rotates together with the table shaft 12 (work gear 14) so as to output pulse signals of a Z phase, an A phase, and a B phase. As shown in FIG. 7, merely 1 pulse of the Z-phase pulse is output in one rotation, and the A-phase pulses and the B-phase pulses mutually have a phase difference of 90 degrees and output by a predetermined number of pulses in one rotation.

As shown in FIG. 2, the displacement sensor (gap sensor) is composed of the displacement sensor head 21 of a detection unit and the displacement sensor amplifier 22 of a signal processing unit. Since the displacement sensor is excellent in the sampling speed and repetition accuracy compared with conventional nearby sensors, it can detect the positions of both left and right tooth surfaces of the work gear 14 at a high speed and high accuracy and, since it is free from influence of hysteresis, can simultaneously detect the positions of both the left and right tooth surfaces of the work gear 14 merely by rotation of one direction.

The displacement sensor head 21 is attached to a moving mechanism such as a turning mechanism, which is not shown, and, when the meshing angle is to be detected, it is caused to move (approach) to the vicinity of the teeth 18 of the work gear 14 attached to the table shaft 12 as shown in FIG. 2 by the moving mechanism so that it is disposed to face the teeth 18; meanwhile, when meshing angle detection is finished, it is moved to a standby position by the moving mechanism so that it does not disturb finishing processing by the grinding tool 13. A device which can simultaneously process analog signals (gap values) and digital signals (determination output of High-Low with respect to a threshold value) output from the displacement sensor head 21 is used as the displacement sensor amplifier.

The detection signals of the displacement sensor are not output to the NC device 26 like conventional cases, but are output to the high-speed meshing-dedicated circuit board 24 so that a meshing angle obtained by the high-speed meshing-dedicated circuit board 24 is output to the NC device 26. The NC device 26 performs, for example, numerical value control of each shaft such as the main shaft 11 and the table shaft 12.

As exemplary shown in FIG. 3 (*a*), a successive high-speed skip function of the NC device takes, for example, 24 msec or more for signal update of ON to OFF or OFF to ON with respect to input signals from outside. Meanwhile, as exemplary shown in FIG. 3 (*b*), the displacement sensor can output an ON-OFF signal at a shortest interval (sampling speed) of, for example, 25 µsec. Therefore, in the combination of the displacement sensor and the NC device, the signal interval (input time) which can be processed on the NC device side is limited; therefore, the rotation speed of the work gear has to be reduced to detect the positions of both the left and right tooth surfaces; and, as a result, the excellent response speed (sampling speed) of the displacement sensor cannot be fully utilized.

Therefore, in the present embodiment, the meshing-dedicated circuit board 24, which can process the detection signals at a high speed and calculate the meshing angle, is developed and manufactured, and it is configured so that the detection signals (ON/OFF signals) of the displacement sensor are output to the high-speed meshing-dedicated circuit board 24. In the high-speed meshing-dedicated circuit board 24, a clock (see a clock unit 57 in FIG. 13) of a clock frequency of 40 kHz or more is mounted corresponding to the response speed (sampling speed) of the displacement sensor which is 25 µsec, and the computing speed of a processor (see a processor unit 49 of FIG. 13) mounted on the high-speed meshing-dedicated circuit board 24 is increased, thereby fully utilizing the ability of the displacement sensor side.

Herein, based on FIG. 4, detection signals of the displacement sensor head 21 and signal processing of the displacement sensor amplifier 22 will be described. FIG. 4 (*a*) shows a diagram in which a part of the teeth 18 and tooth grooves 27 of the work gear 14 is developed. When, with respect to this, the table shaft 12 (work gear 14) is rotated at a predetermined rotation speed by the table shaft motor 16 as shown by the arrow A4 in FIG. 2, the displacement sensor head 21 outputs a detection signal as shown in FIG. 4 (*b*) corresponding to the shape of the teeth 18 and tooth grooves 27 of the work gear 14. In other words, the displacement sensor head 21 detects the distances (gaps) from the displacement sensor head 21 to the teeth 18 and the tooth grooves 27. The detection signal (gap values) of the displacement sensor head 21 is, for example, an analog signal of −5 to +5 V. When the detection signal (analog signal) is output from the displacement sensor head 21 to the displacement sensor amplifier 22, the displacement sensor amplifier 22 compares the detection signal as shown in FIG. 4 (*b*) and a trigger level (threshold value), which is set in advance, and outputs an ON-OFF signal of High or Low when the detection signal crosses the trigger level.

The displacement sensor amplifier 22 in the shown example is set so as to output an OFF signal (Low signal) of 0 V when the detection signal crosses the trigger level from the state smaller than the trigger level to the state larger than that and output an ON signal (High signal) of 5 V when the detection signal crosses the trigger level from the state larger than the trigger level to the state smaller than that. In other words, in the shown example (see FIG. 2 and FIG. 4), the ON signal (High signal) is a position detection signal of the left tooth surface 28 of the work gear 14, and the OFF signal (Low signal) is a position detection signal of the right tooth surface 29 of the work gear 14.

Note that the trigger level can be set to an arbitrary value as long as it is within a range of a maximum value and a minimum value of the detection signal. Also, in the manner opposite to the above description, the position detection signal of the left tooth surface 28 can be OFF signal (Low signal), and the position detection signal of the left tooth surface 29 can be an ON signal (High signal).

Then, the ON-OFF signal output from the displacement sensor amplifier 22 is input to the high-speed meshing-dedicated circuit board 24, and the high-speed meshing-dedicated circuit board 24 obtains the meshing angle of the work gear 14 based on the ON-OFF signal, or the like.

The flow of the meshing angle detection process by the high-speed meshing-dedicated circuit board 24 and the NC device 26 will be described based on the flow charts of FIG. 5 and FIG. 6. (*A) described in FIG. 5 continues to (*A) described in FIG. 6. Note that the outline of the circuit configuration and the outline of state transition of the high-speed meshing-dedicated circuit board 24 will be described later (see FIG. 13 and FIG. 14).

As shown in FIG. 5, when the displacement sensor head 21 is caused to approach the work gear 14 by controlling the moving mechanism by the NC device 26 so as to achieve the state shown in FIG. 2, and, for example, power is supplied to the high-speed meshing-dedicated circuit board 24 so as to complete preparation of the meshing angle detection process, the meshing angle detection process is started (step S1), and rotation of the table shaft 12 (work gear 14) is started by starting actuation of the table shaft motor 16 by the NC device 26 (step S2).

During the periods close to rotation start or rotation stop, the rotation speed of the table shaft 12 (work gear 14) is not constant; therefore, the table shaft 12 (work gear 14) is excessively rotated more than 360 degrees. For example, the rotation amount of the table shaft 12 (work gear 14) is 360±50 degrees as followings (step S3).

−50 degrees (start table shaft rotation)
0 degree (start detection)
360 degrees (finish detection)
410 degrees (finish table shaft rotation)

When power is turned off and the power is turned on again, the NC device 26 is not aware of the starting position (Z-phase position of the rotary encoder 23) of the table shaft 12; therefore, table shaft rotation for returning to the starting point is performed before performing table shaft rotation (step S2) for tooth surface position detection. The Z-phase position of the rotary encoder 23, that is, the starting point position of the table shaft 12 is confirmed by the Z-phase pulse (starting point signal) that is output from the rotary encoder 23 when the table shaft rotation for returning to the starting point is performed. When the starting point position of the table shaft 12 is understood in the NC device 26, the Z-phase pulse can be output from the rotary encoder 23 at the point of time when the table shaft 12 is rotated by 50 degrees from rotation start (point of time of 0 degree) or a point of time close to that; as a result, the tooth surface position detection can be reliably performed within the range (above described range of 0 degree to 360 degrees) in which the rotation speed of the table shaft 12 is stable.

Then, when the table shaft rotation for tooth surface position detection by the NC device 26 is started (steps S2 and S3), and the Z-phase pulse is output from the rotary encoder 23 as exemplary shown in FIG. 7, the high-speed meshing-dedicated circuit board 24 obtains the angles of both the left and right tooth surfaces ($C_1, C_2, C_3, C_4, \ldots C_{2Z-1}, C_{2Z}$) based on the Z-phase pulse (starting point signal) (step S4).

More specifically, the number of pulses of the A-phase pulses and the B-phase pulses output from the rotary encoder 23 during the period from when the Z-phase pulse (starting point signal) is output and until the ON signal (left tooth surface position detection signal) and the OFF signal (right tooth surface position detection signal) of the displacement sensor (displacement sensor amplifier 22) is output is counted. Then, the counted values are converted into angles of both the both left and right tooth surfaces 28 and 29 based on predetermined relation between the pulse number of the rotary encoder 23 and the rotation angle, thereby obtaining the angles ($C_1, C_3, \ldots, C_{2Z-1}$) of the left tooth surfaces 28 of all the teeth 18 from the Z phase (starting point) as exemplary shown in FIG. 8 and the angles ($C_2, C_4, \ldots, C_{2Z}$) of the right tooth surfaces 29 of all the teeth 18 from the Z phase (starting point) as exemplary shown in FIG. 9 (step S4). That is, in the present embodiment, step S4 is a first process (means). In other words, the Z phase of the rotary encoder 23 is used as the starting point of the table shaft 12 (work rotation shaft), the number of pulses of the A-phase pulses and the B-phase pulses output from the rotary encoder 23 is counted after the Z-phase pulse is output from the rotary encoder 23, and the counted values are latched (retained) by the ON-OFF signals (left tooth surface position detection signal and right tooth surface position detection signal) of the displacement sensor (displacement sensor head 21 and displacement sensor amplifier 22), thereby obtaining the left tooth surface angles and the right tooth surface angles from the starting point of the table shaft 12 (work rotation shaft). As the counting method of the number of pulses of the A-phase pulses and the B-phase pulses, for example, a quad edge evaluation method (see "measurement pitch" in FIG. 7) can be used.

Then, the angles of both the left and right tooth surfaces ($C_1, C_2, C_3, C_4, \ldots, C_{2Z-1}, C_{2Z}$) of all the teeth 18 obtained herein are stored, the number of teeth Z of the work gear 14 is input (for example, an operator input by an input device which is not shown), and an initial value (0) of a minimum value ARmin of an accumulated pitch error ARi of all the right tooth surfaces 29 and an initial value (0) of a maximum value ALmax of an accumulated pitch error ALi of all the left tooth surfaces 28 are set (step S4).

Next, as the angles of the tooth surfaces serving as references for obtaining the accumulated pitch errors, $C_1$ is set for the left tooth surface 28, $C_2$ is set for the right tooth surface 29, and the accumulated pitch error ALi of the left tooth surface 28 and the accumulated pitch error ARi of the right tooth surface 29 of the i-th (i=2, 3, 4, ..., Z) tooth 18 are obtained respectively by the below expressions. In the below expressions, ($C_{2i-1} - C_1$) is an accumulated pitch (actual measurement value) of the left tooth surfaces 28 as exemplary shown in FIG. 8, ($C_{2i} - C_2$) is an accumulated pitch (actual measurement value) of the right tooth surfaces 29 as exemplary shown in FIG. 9, and (360/Z) (i−1) is an ideal accumulation pitch (without an error). Then, according to the computing results, the maximum value ALmax among the accumulated pitch errors ALi of all the left tooth surfaces 28 and the minimum value ARmin among the accumulated pitch errors ARi of all the right tooth surfaces 29 are obtained.

$$ALi = (C_{2i-1} - C_1) - (360/Z)(i-1) \quad (i=2, 3, 4, \ldots, Z)$$

$$ARi = (C_{2i} - C_2) - (360/Z)(i-1) \quad (i=2, 3, 4, \ldots, Z)$$

More specifically, when it is described based on the flow chart of FIG. 6, first of all, 2 is set as i (step S5). Subsequently, the value of $C_{2i-1}$ and the value of $C_1$ are compared with each other with respect to the left tooth surfaces 28 (step S6), the value of $C_{2i-1}$ is set as the value of $C_{2i-1}$ without modification when the value of $C_{2i-1}$ is larger than the value of $C_1$ (step S7), and the value of ($C_{2i-1}$+360) is set as the value of $C_{2i-1}$ when the value of $C_{2i-1}$ is equal to or less than the value of $C_1$ (step S8).

Then, based on the value of $C_1$ and the value of $C_{2i-1}$ set in step S7 or S8, according to the above described computing expression of ALi, the accumulated pitch ALi of the left tooth surfaces 28 is computed (step S9).

Next, the value of ALi obtained in step S9 and the value of ALmax are compared with each other (step S10). When the value of ALi is smaller than the value of ALmax, the value of the ALmax is unchanged (step S12); and, when the value of ALi is equal to or larger than the value of ALmax, the value of the ALi is set as the value of ALmax (step S11).

With respect to the right tooth surfaces 29, the value of $C_{2i}$ and the value of $C_2$ are compared with each other (step S13). When the value of $C_{2i}$ is larger than the value of $C_2$, the value of $C_{2i}$ is set as the value of $C_{2i}$ without change (step S14); and, when the value of $C_{2i}$ is equal to or less than the value of $C_2$, the value of ($C_{2i}$+360) is set as the value of $C_{2i}$ (step S15).

Then, based on the value of $C_2$ and the value of $C_{2i}$ set in step S14 or S15, the accumulated pitch ARi of the left tooth surface 28 is computed according to the above described computing expression of ARi (step S16).

Note that, according to the concept of the accumulated pitch error, the values of ($C_{2i-1} - C_1$) and ($C_{2i} - C_2$) are always positive values (see FIG. 8 and FIG. 9). Therefore, if the value of the left tooth surface angle $C_{2i-1}$ or the right tooth surface angle $C_{2i}$ becomes a value which has exceeded 360 degrees and counted from 0 degree, the values of ($C_{2i-1} - C_1$) and ($C_{2i} - C_2$) become negative values. Therefore, when the value of $C_{2i-1}$ is determined to be equal to or less than the value of $C_1$ in step S6 or the value of $C_{2i}$ is determined to be equal to or less than the value of $C_2$ in step S13, the process of step S8 or S15 is performed; thus, the value of ($C_{2i-1} - C_1$) or ($C_{2i} - C_2$) is always a positive value in step S9 or S16.

Next, the value of ARi obtained in step S16 and the value of ARmin are compared with each other (step S17). When the value of ARi is equal to or larger than the value of ARmin, the value of ALmax is unchanged (step S18); and, when the value of ARi is smaller than the value of ARmin, the value of ARi is set as the value of ARmin (step S19).

Next, the value of i is caused to be (i+1) (step S20), and the processes of above described steps S6 to S12 and steps S13 to S19 are repeated until the value of i reaches the value of the number of teeth Z (step S21). Thus, the maximum value ALmax of the accumulated pitch errors of all the left tooth surfaces 28 and the minimum value ARmin of the accumulated pitch errors of all the right tooth surfaces 29 can be obtained. In the present embodiment, step S5 to S21 are a second process (means) and a third process (means).

Subsequently, the position (angle) $\theta_0$ of a reference tooth groove 27 shown in FIG. 8 and FIG. 9 is obtained by the below expression (step S22). In the present embodiment, step S22 is a fourth process (means). As shown in FIG. 10, the angle from the vertex (center portion in the width direction) of the tooth 18 to the vertex (center portion in the width direction) of the adjacent tooth 18 can be obtained by dividing 360 degrees by the number of teeth Z, and ½ of that is the position between the vertices of the two adjacent teeth 18, that is, the position of the reference tooth groove 27 (angle from the vertex of the tooth 18 to the reference tooth groove 27). The angle from the Z phase (starting point) to the vertex of the tooth 18 can be obtained by $(C1+C2)/2$. Therefore, the angle $\theta_0$ from the Z phase (starting point) to the reference tooth groove 27 can be obtained by the below expression.

$$\theta_0=(C1+C2)/2+(360/Z)/2$$

Next, a correction value $\delta\theta$ of the reference tooth groove angle $\theta_0$ is computed by the below expression (step S23). In the present embodiment, step S23 is a fifth process (means).

$$\delta\theta=(ARmin+ALmax)/2$$

In order to cancel the accumulated pitch errors of both the left and right tooth surfaces 28 and 29, to prevent insufficiently ground portions on both the left and right tooth surfaces 28 and 29, and to reduce the grinding allowance of both the left and right tooth surfaces 28 and 29, the reference tooth groove angle $\theta_0$ has to be corrected.

When the direction of an arrow A10, that is, the clockwise (rotation direction in which the right tooth surface 29 precedes in each tooth 18) direction of the work gear 14 is as a positive direction as exemplary shown in FIG. 11, the correction amount $\delta\theta$, which satisfies the above described requirements, can be obtained by averaging the maximum accumulated pitch error ALmax (error largest in the positive direction) of the left tooth surfaces 28 and the minimum accumulated pitch error ARmin (largest error in the negative direction opposite to the arrow A10: largest absolute value) of the right tooth surfaces 29 by the above described expression and equalizing the accumulated pitch errors ALmax and ARmin in the left and right.

In FIG. 11, dotted lines represent the tooth surfaces 28 and 29 of both the left and right sides of the reference tooth groove 27 of the case which is supposed to be an ideal case without accumulated pitch errors, and solid lines show the left tooth surface 28 having the maximum accumulated pitch error ALmax and the right tooth surface 29 having the minimum accumulated pitch error ARmin among all the tooth surfaces 28 and 29 virtually overlapped with the tooth surfaces 28 and 29 of the dotted lines, and the distance between both the left and right tooth surfaces 28 and 29 is the largest in this virtual state. The reason for obtaining the correction amount $\delta\theta$ based on the left tooth surface 28 having the maximum accumulated pitch error ALmax and the right tooth surface 29 having the minimum accumulated pitch error ARmin in this manner is that insufficiently ground portions are conceived to be most likely generated on the left tooth surface 28 and the right tooth surface 29.

Then, the optimal meshing angle $\theta$ to be finally obtained is computed by the below expression (step S24), the meshing angle $\theta$ is output to the NC device 26 (step S25), and the process is terminated (step S26). In the present embodiment, step S24 is a fifth process (means).

$$\theta=\theta_0+\delta\theta$$

Then, the NC device 26 controls the rotation of the table shaft motor 16 based on the detection signals (pulse signals) from the rotary encoder 23, thereby correcting the rotation phases of the grinding tool 13 (main shaft 11) and the work gear 14 (table shaft 12), which are rotated in synchronization with each other, merely by the correction amount $\delta\theta$ as exemplary shown in FIG. 11. Thus, the rotation phases of the grinding tool 13 (main shaft 11) and the work gear 14 (table shaft 12) are caused to be optimal; and, when the drive units of each shaft are controlled in this state in the manner similar to conventional cases, the teeth (mountains and valleys) of the grinding tool 13 are meshed with the teeth 18 (mountains and valleys) of the work gear 14. Thus, meshing is completed, and actual finishing process is started.

Note that the case in which the work gear 14 is rotated forward (rotation in the direction of the arrow A4 shown in FIG. 2, FIG. 8, and FIG. 9) so as to detect the meshing angle has been described above; however, as a matter of course, even when the work gear 14 is rotated reversely, the optimal meshing angle $\theta$ wherein the reference tooth groove angle $\theta_0$ is corrected by the correction value $\delta\theta$ can be obtained by processes similar to those described above although detailed descriptions will be omitted.

In the above description, the angles of both the left and right tooth surfaces $(C_1, C_2, C_3, C_4, \ldots, C_{2Z-1}, C_{2Z})$ are obtained based on the pulse signals of the rotary encoder 23; however, it is not limited thereto, and the angles of both the left and right tooth surfaces $(C_1, C_2, C_3, C_4, \ldots, C_{2Z-1}, C_{2Z})$ may be obtained based on the clock pulses transmitted from an internal clock equipped in the high-speed meshing-dedicated circuit board 24. In this case, a starting point detection means which outputs a starting point signal instead of the Z-phase pulse of the rotary encoder 23 is required.

The starting point detection means in this case may have, for example, a configuration as shown in FIG. 12 as long as the starting point of the table shaft 12 (work rotation shaft) can be detected. As shown in FIG. 12 ($a$), a starting point projection 31 indicating a starting point of the table shaft 12 is provided at one location of the outer peripheral surface of the table shaft 12, and the starting point projection 31 is detected by an arbitrary starting point detection sensor 32 such as a nearby sensor or a displacement sensor. The starting point detection sensor 32 outputs a detection signal of the starting point projection 31 to the high-speed meshing-dedicated circuit board 24. That is, the starting point detection signal of the starting point detection sensor 32 serves as a substitute for the Z-phase pulse of the rotary encoder 23. Note that the starting point projection 31 is not limited to the case in which it is directly provided on the table shaft 12 like the example shown in the drawing, and it may be provided on another rotation shaft coupled to the table shaft. More specifically, when another rotation shaft which is coupled to the table shaft 12 and rotates together with the table shaft 12 is provided, the starting point projection 31 indicating the starting point of the table shaft 12 can be provided at one location of the outer peripheral surface of the other rotation shaft.

When a starting point detection signal is output (output one time in one rotation) from the starting point detection sensor 32 as shown in FIG. 12 ($b$), the high-speed meshing-dedicated circuit board 24 obtains the angles $(C_1, C_2, C_3, C_4, \ldots, C_{2Z-1}, C_{2Z})$ of both the left and right tooth surfaces 28 and 29 based on the starting point detection signal.

Specifically, the number of pulses of clock pulses output from the clock during the period from when the starting point detection signal is output until the ON signal or the OFF signal of the displacement sensor (displacement sensor amplifier 22) is output is counted. Then, the counted values are converted into the angles of both the left and right tooth surfaces 28 and 29 based on the relation between the number of pulses of the clock pulses and the rotation angles (relation between clock frequencies and the rotation speed of the table shaft 12), thereby obtaining the angles $(C_1, C_3, \ldots, C_{2Z-1})$ of the left tooth surfaces 28 of all the teeth 18 from the starting point as well as FIG. 8 and the angles $(C_2, C_4, \ldots, C_{2Z})$ of the right tooth surfaces 29 of all the teeth 18 from the starting point as well as FIG. 9. In other words, the rotation speed of the work gear 14 is assumed to be constant, the number of pulses of the clock pulses (reference pulses) output from the internal clock after the starting point detection signal is output from a starting point detection means such as the starting point detection sensor 32 is counted, and the counted value is latched (retained) by the ON-OFF signals (left tooth surface position detection signal and right tooth face position detection signal) of the displacement sensor 22, thereby obtaining the left tooth surface angles and the right tooth surface angles from the starting point of the table shaft 12 (work rotation shaft). Note that, when the clock pulses are utilized, the setting of the rotation speed of the table shaft 12 (work gear 14) may be switchable, for example, in two levels between a low-speed mode in which the work gear 14 is rotated at a low constant rotation speed and a high-speed mode in which it is rotated at a high constant rotation speed.

The processing contents after that until the meshing angle θ is obtained are similar to the process of the above described case in which the rotary encoder 23 is used (see FIG. 6), the description thereof will be omitted herein.

Herein, based on FIG. 13, the outline of the circuit configuration of the high-speed meshing-dedicated circuit board 24 will be described.

As shown in FIG. 13, the high-speed meshing-dedicated circuit board 24 has: input connector units 41, 42, 43, and 44 composed of connectors, or the like; an encoder signal input IF circuit unit 45 composed of an actuation input transistor, a resistor, a capacitor, or the like; an NC/starting point detection signal input IF circuit unit 46 composed of a photocoupler, a transistor, a resistor, a capacitor, or the like; a displacement sensor input IF circuit unit 47 composed of a photocoupler, a transistor, a resistor, a capacitor, or the like; a ROM unit 48 composed of a ROMIC, a resistor, a capacitor, or the like; a processor unit 49 composed of a micro processor, a capacitor, or the like; a DCDC conversion unit 50 composed of a DCDC converter, a capacitor, or the like; a 24 V power source unit 51 composed of a D power source, a capacitor, or the like; a power source input terminal base unit 52 composed of a terminal base, or the like; a reset switch unit 53 composed of a switch, or the like; a DIPSW unit 54 composed of a switch, a resistor, or the like; a LED display unit 55 composed of a LED, or the like; a LED drive unit 56 composed of a transistor, a resistor, a capacitor, or the like; a clock unit 57 composed of a clock IC, or the like; a SRAM unit 58 composed of a SRAM or the like; an output IF unit 59 composed of a photocoupler, a transistor, a resistor, a capacitor, or the like; and an output connector unit 60 composed of a connector, or the like.

Outlines of each unit will be described. External input wiring is connected to the input connector units 41, 42, 43, and 44. In the encoder signal input IF circuit unit 45, the level of the input signal from the rotary encoder 23 is converted into a signal level for processor input (conversion from 5 V to 3.3 V). The NC/starting point detection signal input IF circuit unit 46 converts the level of the input signal from the NC device 26 or the starting point detection sensor 32 to a signal level for processor input (conversion from 5 V to 3.3 V). The displacement sensor input IF circuit unit 47 converts the level of the input signal from the displacement sensor amplifier 22 to the signal level for processor input (conversion from 5 V to 3.3 V). The ROM unit 48 stores a program (for example, a computing program of the meshing angle), and the program is loaded to the processor. The processor unit 49 performs the processes as shown in FIG. 14 based on the program. The DCDC conversion unit 50 supplies 3.3 V power to 3.3 V-based transistors.

The 24 V power source unit 51 receives a voltage of 24 V and supplies a voltage of 5 V to 5 V-based transistors. The power source input terminal base unit 52 performs wiring connection of an external power source (DC 24 V). The reset switch unit 53 performs reset of the processor. The DIPSW unit 54 is for setting of the processor. The LED display unit 55 displays an operation state of the high-speed meshing-dedicated circuit board 24 by 7-segment LED display. The LED drive unit 56 drives display signals from the processor for LED. The clock unit 57 generates a reference clock pulse of the processor. The clock pulse is utilized also for obtaining the angles of both the left and right tooth surfaces 28 and 29 as described above. The SRAM unit 58 stores measurement data. The output IF unit 59 converts the output signal level of the processor from 3.3 V to 24 V. The output connector unit 60 connects external output wiring.

Subsequently, based on FIG. 14, an outline of the state transition of the high-speed meshing-dedicated circuit board 24 will be described.

In FIG. 14, upon power source ON 61, power is supplied from an external power source, and READY output to the NC device 26 is performed. In initialization 62, internal variables are cleared. In an idle state 63, a command from the NC device 26 is waited for, and transition to a state corresponding to the command from the NC device 26 is made. In data setting 64, the type of set data is identified, data corresponding to the type (for example, the number of teeth Z) is set, whether a part of the data (for example, the number of teeth Z) is within the range of specification or not is checked, and an error is output if it is out of the specification range. In data output 65 to the NC device, the maximum value and the minimum value of the accumulated pitch errors, the clock frequency of the high-speed meshing-dedicated circuit board 24, and the like are output to the NC device 26 in accordance with requests of the NC device 26, and whether the type of the requested data is within a specification range or not is checked, and an error is output if it is outside the specification range. In a calculation process 66, calculation processes such as those shown in FIG. 5 and FIG. 6 are performed, whether the accumulated pitch error is excessively large or not is checked, and an error is output if it is excessive. In error output 67, error information notification to the NC device 26 is performed. In reference pulse count value acquisition 68, the A-phase pulses and the B-phase pulses of the rotary encoder 23 are counted when an encoder mode is selected, and the clock pulses are counted when a low-speed/high-speed mode is selected. In display 69, in accordance with DIPSW of the high-speed meshing-dedicated circuit board 24, each data or error information is displayed.

<Working Effects>

As described above, the gear meshing angle detection device of the present embodiment is characterized by having a first means of obtaining left tooth surface angles ($C_1$, $C_3$, $C_{2Z-1}$) and right tooth surface angles ($C_2$, $C_4$, ..., $C_{2Z}$) from a starting point of the table shaft 12 for all teeth 18 of the work gear 14; a second means of obtaining a left tooth surface accumulated pitch error $ALi$ and a right tooth surface accumulated pitch error $ARi$ for all the teeth 18 based on the left tooth surface angles ($C_1$, $C_3$, ..., $C_{2Z-1}$) and the right tooth surface angles ($C_2$, $C_4$, ..., $C_{2Z}$); a third means of obtaining a left tooth surface maximum accumulated pitch error $ALmax$ and a right tooth surface minimum accumulated pitch error $ARmin$ from the left tooth surface accumulated pitch error $ALi$ and the right tooth surface accumulated pitch error $ARi$ wherein the clockwise direction of the work gear 14 is as a positive direction; a fourth means of obtaining an angle $\theta_0$ of a reference tooth groove 27 based on the left tooth surface angles ($C_1, C_3, \ldots, C_{2Z-1}$) and the right tooth surface angle ($C_2, C_4, \ldots, C_{2Z}$); a fifth means of averaging the left tooth surface maximum accumulated pitch error ALmax and the right tooth surface minimum accumulated pitch error ARmin so as to obtain a correction value $\delta\theta$ of an angle $\theta_0$ of the reference tooth groove; and a sixth means of correcting the reference tooth groove angle $\theta_0$ by the correction value $\delta\theta$ so as to obtain the meshing angle $\theta$. Therefore, in other words, the correction value $\delta\theta$ is obtained based on the left tooth surface 28 having the maximum accumulated pitch error ALmax (when clockwise direction is a positive direction) and the right tooth surface 29 having the minimum accumulated pitch error ARmin (when clockwise direction is a positive direction), which are conceived to most likely generate insufficiently ground portions. The reference tooth groove angle $\theta_0$ is corrected by the correction value $\delta\theta$, thereby obtaining the meshing angle $\theta$ of the work gear 14. Therefore, the optimal meshing angle $\theta$ which can cancel the accumulated pitch errors of both the left and right tooth surfaces 28 and 29, prevent generation of insufficiently ground portions on both the left and right tooth surfaces 28 and 29, and reduce the grinding allowance of both the left and right tooth surfaces 28 and 29 as much as possible can be obtained.

Moreover, the gear meshing angle detection device of the present embodiment is characterized in that, in the first process (means), the Z phase of the rotary encoder 23 is used as the starting point of the table shaft 12 (work rotation shaft), the number of pulses of the A-phase pulse and the B-phase pulse which are output from the rotary encoder after the Z-phase pulse is output from the rotary encoder 23 is counted, and the counted values are latched (retained) by ON-OFF signals (the left tooth surface position detection signal and the right tooth surface position detection signal) of the displacement sensor (displacement sensor head 21 and displacement sensor amplifier 22) so as to obtain the left tooth surface angles ($C_1, C_3, \ldots, C_{2Z-1}$) and the right tooth surface angle ($C_2, C_4, \ldots, C_{2Z}$) from the starting point of the table shaft 12 (the work rotation shaft). Therefore, both the left and right tooth surface angles of all the teeth 18 ($C_1, C_2, C_3, C_4, \ldots, C_{2Z-1}, C_{2Z}$) can be detected at high accuracy and at a high speed.

Moreover, the gear meshing angle detection device of the present embodiment is characterized in that, in the first process (means), the number of pulses of the clock pulse (reference pulse) output from the internal clock is counted after the starting point detection signal is output from the starting point detection means such as the starting point detection sensor 32, and the counted value is latched (retained) by the ON-OFF signals (the left tooth surface position detection signal and the right tooth surface position detection signal) of the displacement sensor 22 so as to obtain the left tooth surface angles ($C_1, C_3, \ldots, C_{2Z-1}$) and the right tooth surface angles ($C_2, C_4, \ldots, C_{2Z}$) from the starting point of the table shaft 12 (the work rotation shaft). Therefore, both the left and right tooth surface angles ($C_1, C_2, C_3, C_4, \ldots, C_{2Z-1}, C_{2Z}$) of all the teeth 18 can be detected at high accuracy and at a high speed.

Moreover, the gear meshing angle detection device of the present embodiment is characterized in that the first means, the second means, the third means, the fourth means, the fifth means, and the sixth means are calculation processing programs executed by a processor (processor unit 49) mounted in the high-speed meshing-dedicated circuit board 24, and a clock (clock unit 57) of a clock frequency which can handle a response speed of the displacement sensor is mounted on the meshing-dedicated circuit board. Therefore, both the left and right tooth surface angles ($C_1, C_2, C_3, C_4, \ldots, C_{2Z-1}, C_{2Z}$) of all the teeth 18 can be detected at a significantly high speed by fully utilizing the excellent response speed (sampling speed) of the displacement sensor.

INDUSTRIAL APPLICABILITY

The present invention relates to a gear meshing angle detection method and device, which are effective in application to, for example, the cases in which meshing is performed at a high speed and at high accuracy in a gear finishing machine such as a gear grinding machine so as to perform highly accurate finishing processing of a gear.

The invention claimed is:

1. A gear meshing angle detection method which detects a meshing angle of a work gear attached to a work rotation shaft, including
   a first process of obtaining a left tooth surface angle and a right tooth surface angle from a starting point of the work rotation shaft for all teeth of the work gear using a displacement sensor when the work gear is rotated in one direction;
   a second process of obtaining a left tooth surface accumulated pitch error and a right tooth surface accumulated pitch error for all the teeth based on the left tooth surface angle and the right tooth surface angle using a meshing angle detection device during rotation in the one direction;
   a third process of obtaining a left tooth surface maximum accumulated pitch error and a right tooth surface minimum accumulated pitch error from the left tooth surface accumulated pitch error and the right tooth surface accumulated pitch error, respectively, wherein the clockwise direction of the work gear is as a positive direction using the meshing angle detection device;
   a fourth process of obtaining an angle of a reference tooth groove based on the left tooth surface angle and the right tooth surface angle using the meshing angle detection device;
   a fifth process of averaging the left tooth surface maximum accumulated pitch error and the right tooth surface minimum accumulated pitch error so as to obtain a correction value of an angle of the reference tooth groove using the meshing angle detection device; and
   a sixth process of correcting the reference tooth groove angle by the correction value so as to obtain the meshing angle using the meshing angle detection device during rotation in the one direction.

2. The gear meshing angle detection method described in claim 1, wherein
   an incremental-type rotary encoder which rotates in the one direction together with the work rotation shaft and outputs a Z-phase pulse, an A-phase pulse, and a B-phase pulse and
   a displacement sensor which detects the positions of the left tooth surface and right tooth surface of all the teeth of the work gear and outputs a left tooth surface position detection signal and a right tooth surface position detection signal when the work gear is rotated in the one direction together with the work rotation shaft are used; and,
   in the first process, the Z phase of the rotary encoder is used as the starting point of the work rotation shaft, the number of pulses of the A-phase pulse and the B-phase pulse which are output from the rotary encoder after the Z-phase pulse is output from the rotary encoder is counted, and the counted values are latched by the left tooth surface position detection signal and the right tooth surface position detection signal of the displacement sensor so as to obtain the left tooth surface angle and the right tooth surface angle from the starting point of the work rotation shaft.

3. The gear meshing angle detection method described in claim 1, wherein
a starting point detection means which detects the starting point of the work rotation shaft and outputs a starting point detection signal when the work rotation shaft is rotated in the one direction,
a clock which outputs a clock pulse, and
a displacement sensor which detects the positions of the left tooth surface and the right tooth surface of all the teeth of the work gear and outputs a left tooth surface position detection signal and a right tooth surface position detection signal when the work gear is rotated in the one direction together with the work rotation shaft are used; and,
in the first process, the number of pulses of the clock pulse output from the clock is counted after the starting point detection signal is output from the starting point detection means, and the counted value is latched by the left tooth surface position detection signal and the right tooth surface position detection signal of the displacement sensor so as to obtain the left tooth surface angle and the right tooth surface angle from the starting point of the work rotation shaft.

4. A gear meshing angle detection device which detects a meshing angle of a work gear attached to a work rotation shaft, including
a first means of obtaining a left tooth surface angle and a right tooth surface angle from a starting point of the work rotation shaft for all teeth of the work gear when the work gear is rotated in one direction;
a second means of obtaining a left tooth surface accumulated pitch error and a right tooth surface accumulated pitch error for all the teeth based on the left tooth surface angle and the right tooth surface angle during rotation in the one direction;
a third means of obtaining a left tooth surface maximum accumulated pitch error and a right tooth surface minimum accumulated pitch error from the left tooth surface accumulated pitch error and the right tooth surface accumulated pitch error, respectively, wherein the clockwise direction of the work gear is as a positive direction;
a fourth means of obtaining an angle of a reference tooth groove based on the left tooth surface angle and the right tooth surface angle;
a fifth means of averaging the left tooth surface maximum accumulated pitch error and the right tooth surface minimum accumulated pitch error so as to obtain a correction value of an angle of the reference tooth groove; and
a sixth means of correcting the reference tooth groove angle by the correction value so as to obtain the meshing angle during rotation in the one direction.

5. The gear meshing angle detection device described in claim 4, wherein
an incremental-type rotary encoder which rotates in the one direction together with the work rotation shaft and outputs a Z-phase pulse, an A-phase pulse, and a B-phase pulse and a displacement sensor which detects the positions of the left tooth surface and right tooth surface of all the teeth of the work gear and outputs a left tooth surface position detection signal and a right tooth surface position detection signal when the work gear is rotated in the one direction together with the work rotation shaft are provided; and,
in the first means, the Z phase of the rotary encoder is used as the starting point of the work rotation shaft, the number of pulses of the A-phase pulse and the B-phase pulse which are output from the rotary encoder after the Z-phase pulse is output from the rotary encoder is counted, and the counted values are latched by the left tooth surface position detection signal and the right tooth surface position detection signal of the displacement sensor so as to obtain the left tooth surface angle and the right tooth surface angle from the starting point of the work rotation shaft.

6. The gear meshing angle detection device described in claim 5, wherein
a meshing dedicated circuit board is provided; and
the first means, the second means, the third means, the fourth means, the fifth means, and the sixth means are calculation processing programs executed by a processor mounted in the meshing-dedicated circuit board, and a clock of a clock frequency which can handle a response speed of the displacement sensor is mounted on the meshing-dedicated circuit board.

7. The gear meshing angle detection device described in claim 4, wherein
a starting point detection means which detects the starting point of the work rotation shaft and outputs a starting point detection signal when the work rotation shaft is rotated in the one direction,
a clock which outputs a clock pulse, and
a displacement sensor which detects the positions of the left tooth surface and the right tooth surface of all the teeth of the work gear and outputs a left tooth surface position detection signal and a right tooth surface position detection signal when the work gear is rotated in the one direction together with the work rotation shaft are provided; and,
in the first means, the number of pulses of the clock pulse output from the clock after the starting point detection signal is output from the starting point detection means is counted, and the counted value is latched by the left tooth surface position detection signal and the right tooth surface position detection signal of the displacement sensor so as to obtain the left tooth surface angle and the right tooth surface angle from the starting point of the work rotation shaft.

8. The gear meshing angle detection device described in claim 7, wherein
a meshing dedicated circuit board is provided; and
the first means, the second means, the third means, the fourth means, the fifth means, and the sixth means are calculation processing programs executed by a processor mounted in the meshing-dedicated circuit board, and a clock of a clock frequency which can handle a response speed of the displacement sensor is mounted on the meshing-dedicated circuit board.

* * * * *